(12) United States Patent
Fischer (10) Patent No.: US 7,039,399 B2
(45) Date of Patent: May 2, 2006

(54) DISTRIBUTION OF WIRELESS TELEPHONY AND DATA SIGNALS IN A SUBSTANTIALLY CLOSED ENVIRONMENT

(75) Inventor: Larry G. Fischer, Wascca, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 285 days.

(21) Appl. No.: 10/095,220

(22) Filed: Mar. 11, 2002

(65) Prior Publication Data
US 2004/0203703 A1 Oct. 14, 2004

(51) Int. Cl.
  *H04Q 7/20* (2006.01)
  *H04Q 7/38* (2006.01)
(52) U.S. Cl. .............. 455/422.1; 455/426.1; 455/426.2; 455/466; 455/414.1; 455/414.4; 455/403; 455/500; 370/338; 370/480; 370/352; 370/494; 370/495; 370/487
(58) Field of Classification Search .......... 455/426.1, 455/426.2, 422.1, 403, 69, 517, 561, 562, 455/500, 462, 465, 54, 466, 414.4, 414.1; 370/339, 463, 338, 480, 352, 494, 495, 487; 709/203, 218, 225, 231, 232
See application file for complete search history.

(56) References Cited

U.S. PATENT DOCUMENTS

| | | | |
|---|---|---|---|
| 4,485,486 A | 11/1984 | Webb et al. | |
| 4,790,000 A | 12/1988 | Kinoshita | |
| 5,642,405 A | 6/1997 | Fischer et al. | |
| 5,644,622 A | 7/1997 | Russell et al. | |
| 5,774,789 A | 6/1998 | van der Kaay et al. | |
| 5,802,173 A | 9/1998 | Hamilton-Piercy et al. | |
| 5,852,651 A * | 12/1998 | Fischer et al. | 455/403 |
| 5,878,325 A | 3/1999 | Dail | |
| 5,946,622 A | 8/1999 | Bojeryd | |
| 5,969,837 A | 10/1999 | Farber et al. | |
| 2002/0034168 A1* | 3/2002 | Swartz et al. | 370/329 |
| 2002/0090915 A1* | 7/2002 | Komara et al. | 455/69 |
| 2002/0191635 A1* | 12/2002 | Chow et al. | 370/463 |
| 2004/0047310 A1* | 3/2004 | Chen et al. | 370/329 |
| 2004/0132407 A1* | 7/2004 | Hein-Magnussen et al. | 455/41.1 |

OTHER PUBLICATIONS

1998 Foxcom Wireless Proprietary Information, pp. 1-8, "Litenna In-Building RF Distribution System".
1998 Foxcom Wireless Proprietary Information, pp. 3-11, Application Note RFiber—RF Fiberoptic Links for Wireless Applications.
ADC Kentrox Wireless Systems Group CityCell 824—A Positioning White Paper, (Mar. 1993) CITA Trade Show.

(Continued)

*Primary Examiner*—Keith Ferguson
(74) *Attorney, Agent, or Firm*—Fogg & Associates, LLC; David N. Fogg (57) ABSTRACT

A communication system is provided. The communication system includes a host unit that is adapted to communicate wireless telephony signals with a telephony network and adapted to communicate wireless data with at least one data network. A communication link carries both the wireless telephony signals and the wireless data. At least one remote antenna unit is communicatively coupled to the host unit over the communication link. The remote antenna unit communicates the wireless telephony signals and the wireless data with wireless terminals. The at least one remote unit further communicates digitized telephony signals and wireless data signals with the host unit over the communication link.

32 Claims, 7 Drawing Sheets

OTHER PUBLICATIONS

"ADC Kentrox Introduces CityCell 824, A Replacement for Conventional Cell Sites; Company's Original Goal Was To Improve Fiber Optic T1 Links Between Cells, MTSOs," Telocator Bulletin, Feb. 1993.

Ishio et al., "A Two-Way Wavelength-Division-Multiplexing Transmission and its Application to a Switched TV-Distribution System," Electrical Communication Laboratories, Nippon Telegraph & Telephone Public Corporation, Ykosuka, Japan; Technical Bureau, Nippon Telegraph & Telephone Public Corporation, Tokyo, Japan (10 pages).

Kobb, "Personal Wireless", Special Report/Communications IEEE Spectrum, Jun. 1993, pp 20-25.

Russell, "New Microcell Technology Sets Cellular Carriers Free," Telephony, Mar. 1993, pp. 40, 42, and 46.

Sarnecki et al., "Microcell Design Principles", Microcell Technology, IEEE Communications Magazine, Apr. 1993, pp. 76-79.

Tang, "Fiber Optic Antenna Remoting for Multi-Sector Cellular Sites", GTE Laboratories Inc., ICC '92, pp. 76-81.

Urban Microcell System Layout—GTE Laboratories.

* cited by examiner

Fig. 7

DISTRIBUTION OF WIRELESS TELEPHONY AND DATA SIGNALS IN A SUBSTANTIALLY CLOSED ENVIRONMENT

CROSS REFERENCE TO RELATED APPLICATIONS

This application is related to the commonly assigned, co-pending application Ser. No. 09/619,431, filed on 19 Jul. 2000, and entitled "Point-to-Multipoint Digital RF Transport" (pending) (the '431 application). The '431 application is incorporated by reference.

TECHNICAL FIELD

The present invention is related to telecommunications systems, and more particularly to distribution of wireless telephony and data signals in a substantially closed environment.

BACKGROUND INFORMATION

Wireless communications systems have evolved into a common mode of communicating used by a wide variety of people. One obstacle to the widespread use of wireless technologies is providing full coverage in areas such as steel frame buildings that tend to inhibit the transmission of radio frequency (RF) signals. Inside these tall shiny buildings (TSBs), signals transmitted from wireless base stations outside the TSBs attenuate dramatically and thus significantly impact the ability to communicate with wireless telephones or terminals located in the buildings.

In some buildings, very low power transmitters with antennas are mounted on the ceiling in hallways and conference rooms within the building to distribute RF signals throughout the building or other substantially closed structure or environment. Various systems have been developed to transport the RF signals to the distributed antennas. For example, in some systems, signals are fed from a single point and then split in order to feed the signals to different points in the building. Simultaneous bi-directional RF distribution often involves splitting signals in the forward path (toward the antennas) and combining signals in the reverse path (from the antennas). Currently this can be performed directly at RF frequencies using passive splitters and combiners to feed a coaxial cable distribution network. In other systems, RF signals from a booster or base station are down converted to a lower frequency, and distributed via CAT 5 (LAN) or coaxial cable wiring to remote antenna units. At the remote antenna units, the signal is up converted and transmitted. In another approach, fiber optic cables are used to distribute signals to antennas inside of a building using either analog modulation or digitization of the RF spectrum.

Other systems have been developed that use wireless communication to transport data between computers of a network. These other systems are referred to as wireless local area networks or WLANs. Conventionally, wireless data and wireless telephony have been implemented in separate systems. The merger of wireless data and wireless telephony in a single system poses many issues including transport of signals to and from remote antennas in a substantially enclosed structure.

Therefore, there is a need in the art for a system that economically provides for transport of both wireless telephony and wireless data in a substantially enclosed structure or environment.

SUMMARY

The above-mentioned problems with distributing RF signals within a building and other problems are addressed by the present invention and will be understood by reading and studying the following specification. Embodiments of the present invention transport wireless data for a wireless data network with digitized telephony signals over a common, digital transport network within substantially closed environments, e.g., buildings, thereby providing an integrated solution for in-building distribution of data and telephony traffic.

In one embodiment, a communication system is provided. The communication system includes a host unit that is adapted to communicate wireless telephony signals with a telephony network and adapted to communicate wireless data with at least one data network. A communication link carries both the wireless telephony signals and the wireless data. At least one remote antenna unit is communicatively coupled to the host unit over the communication link. The remote antenna unit communicates the wireless telephony signals and the wireless data with wireless terminals. The at least one remote unit further communicates digitized telephony signals and wireless data signals with the host unit over the communication link.

DETAILED DESCRIPTION

In the following detailed description of the preferred embodiments, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

I. Overview—First Embodiment

Figure 1:
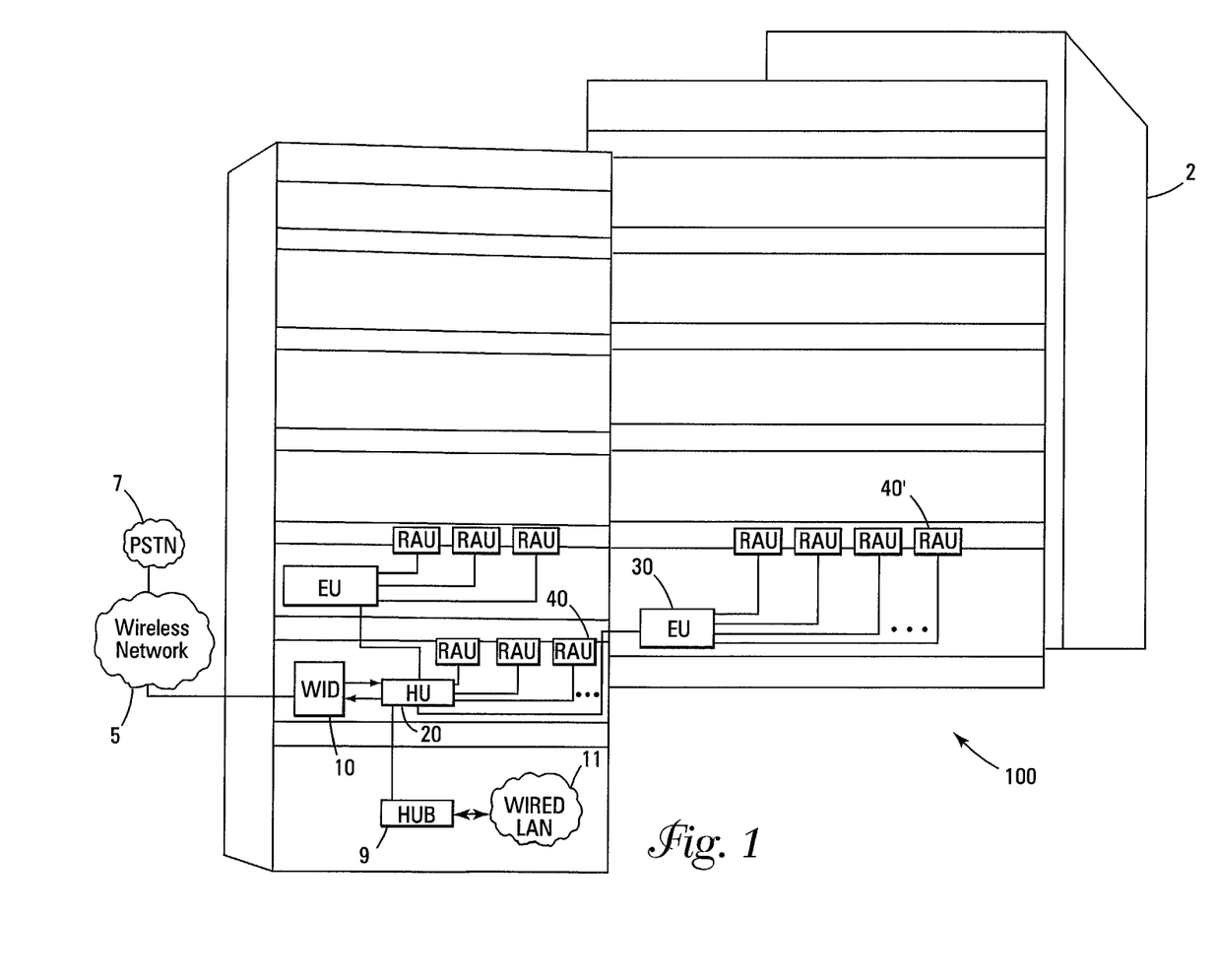
FIG. 1 is an illustration of one embodiment of a communication system for wireless data and telephony according to the teachings of the present invention.

FIG. 1 is an illustration of one exemplary embodiment of a communication system, indicated generally at 100, that provides distribution of wireless telephony and other data in a substantially closed environment, e.g., a building, a campus or other structure. System 100 transports wireless telephony and wireless data over a common infrastructure within the substantially closed environment. Advantageously, the use of a common infrastructure for both telephony and other data reduces the costs and time associated with installing and maintaining two separate systems—one for telephony and one for data—as would be done conventionally.

System 100 communicates with wireless telephones using one or more standard-based protocols. For example, in one embodiment, system 100 supports cellular communication according to any appropriate standard, e.g., Analog Mobile Phone System (AMPS), Total Access Communication System (TACS), Global System for Mobile Communications (GSM), IS-54, IS-95, IS-136 or other analog or digital cellular communication standard. In other embodiments, system 100 supports communications in the Personal Communication Service (PCS) frequency band, e.g., 2 GHz.

System 100 also communicates with wireless data terminals using the same infrastructure as for wireless telephony to implement a wireless local area network (WLAN) using one of a number of standards. For example, in one embodiment, system 100 uses the HIPERLAN standard that is prevalent in Europe. In other embodiments, system 100 supports one of the 802.11 family of WLAN standards promulgated by the Institute of Electrical and Electronics Engineers (IEEE) to implement its wireless data portion. Further, in other embodiments, wireless personal area network (PAN) technology from the Bluetooth Special Interest Group or the HomeRF working group is used to implement the wireless data portion of system 100.

System 100 is shown distributed within a complex of tall shiny buildings (TSBs) 2. Although system 100 is shown in a complex of TSBs 2, it is understood that system 100 is not limited to this embodiment. Rather, system 100 in other embodiments is used to distribute signals in a single building, or other appropriate structure or indoor or outdoor location that exhibits high attenuation to RF signals.

System 100 transports wireless telephony signals and wireless data through a network of remote antenna units (RAUs) 40 and 40', one or more expansion units (EUs) 30 and a host unit (HU) 20. Host unit 20 interfaces with a wireless network 5 for the wireless telephony portion of system 100. Wireless network 5 is coupled to the public switched telephone network (PSTN), or a mobile telecommunications switching office (MTSO) or other switching office/network. Host unit 20 further interfaces with a wired local area network (LAN) 11 (data network) through hub 9 for the wireless data portion of system 100.

In one embodiment, system 100 operates by transporting wireless telephony and data signals digitally over fiber optic cables. In other embodiments, system 100 operates by transporting wireless telephony and data signals as analog signals. In the digital embodiment, telephony and data signals received at HU 20 are distributed to multiple RAUs 40 and 40' to provide coverage throughout a building complex. The digital telephony signals transported between the HU 20 and the RAUs 40 and 40' comprise a digital representation of the telephony RF spectrum. Telephony signals received at each of the RAUs 40 and 40' are summed together at the HU 20 for interface to a wireless network. In one embodiment, the signals are transmitted from the RAUs 40 and 40' as 1.2 Gigabit/s digital signal in 20 bit words. Advantageously, in one embodiment, four of the bits from the 20-bit word are not used for telephony data and are used instead to transport the wireless data from the RAUs 40 and 40' to HU 20. This effectively provides a data pipe with 284 Mbits/s throughput. The multiple RAUs 40 and 40' thus provide an interface for transmission of telephony signals to wireless terminals over a telephony wireless network and data to be transmitted to wireless terminals in a wireless data network.

In one embodiment, expansion unit EU 30 is situated between the HU 20 and one or more RAUs 40'. In the forward path, EU 30 expands the coverage area by splitting signals received from HU 20 to a plurality of RAUs 40'. This includes both telephony data received from WID 10 and wireless data received from hub 9. In the reverse path, EU 30 receives signals from a plurality of RAUs 40'. This includes both wireless telephony and wireless data. EU 30 extracts the wireless data from the signal and digitally sums the digital telephony signals together. EU 30 buffers and formats the wireless data and inserts it into the summed digital telephony signal for transport to HU 20 or another EU 30. This system allows for successive branching of signals using EUs 30 and expanded coverage to multiple RAUs 40 and 40'. This system provides an efficient way of providing signal coverage for wireless communication without added attenuation loss and distance constraint found with analog systems. By using EUs 30, antennas can be placed further from HU 20 without adversely affecting signal strength.

Digital transport system 100 includes a wireless interface device (WID) 10 that provides an interface to a wireless network. In one embodiment, the WID 10 includes either conventional transmitters and receivers or all digital transmitter and receiver equipment, and interface circuitry to a mobile telecommunications switching office (MTSO). In one embodiment, the wireless interface device 10 is coupled to an MTSO via a T1 line and receives and transmits signals between the MTSO and the HU 20. In another embodiment, the wireless interface device 10 is coupled to the public switched telephone network (PSTN). In one embodiment, WID 10 comprises a base station and connects directly to HU 20 via coaxial cables. In another embodiment, WID 10 comprises a base station and wirelessly connects to HU 20 via a bi-directional amplifier that is connected to an antenna. In one embodiment, the antenna is an outdoor antenna.

WID 10 communicates signals between wireless units and the wireless network via remote antenna units RAUs 40 and 40'. WID 10 is coupled to HU 20. The HU 20 is coupled to at least one digital expansion unit EU 30 and a plurality of RAUs 40. In addition, EU 30 is coupled to a plurality of RAUs 40'. The HU 20 receives RF signals from WID 10 and converts the RF signals to digitized RF signals. HU 20 further optically transmits the digital RF signals to multiple RAUs 40 either directly or via one or more EUs 30.

Each RAU 40 and 40' is connected through a fiber optic cable (or optionally another high bandwidth carrier) to transport digital RF signals to one of HU 20 or EU 30. In one embodiment, the fiber optic cable comprises multimode fiber pairs coupled between the RAUs 40 and the HU 20, between the RAUs 40 and 40' and the EUs 30 and between the EUs 30 and the HU 20. In one embodiment, the EU 30 is coupled to the HU 20 via single mode fiber and the EU 30 is coupled to the RAUs 40' via multimode fiber pairs. Although, transport system 100 has been described with fiber optic cable other carriers may be used, e.g., coaxial cable, twisted pair, infrared, microwave, or other appropriate wireless, fiber or copper-based communication medium.

In another embodiment, the HU 20 is coupled to the RAUs 40 by a direct current power cable in order to provide power to each RAU 40. In one embodiment, the direct current power cable delivers 48 VDC to each RAU 40 connected to the HU 20. In another embodiment, the EU 30 is coupled to RAUs 40' by a direct current power cable to provide power to each RAU 40'. In one embodiment, the direct current power cable delivers 48 VDC to each RAU 40' connected to the EU 30. In an alternate embodiment, RAUs 40 and 40' are connected directly to a power supply. In one embodiment, the power supply provides DC power to the RAUs 40 and 40'. In an alternate embodiment, the power supply provides AC power to the RAUs 40 and 40'. In one embodiment, RAUs 40 and 40' each include an AC/DC power converter. In another embodiment, the power cable also carries data between HU 20 and RAUs 40 in addition to providing power to the RAUs.

Both HU 20 and EU 30 split signals in the forward path and sum signals in the reverse path. In order to accurately sum the digital telephony signals together at HU 20 or EU 30 the data needs to come in to the HU 20 or EU 30 at exactly the same rate. As a result all of the RAUs 40 and 40' need to be synchronized so that their digital sample rates are all locked together. Synchronizing the signals in time is accomplished by locking everything to the bit rate over the fiber. In one embodiment, the HU 20 sends out a digital bit stream and the optical receiver at the EU 30 or HU 40 detects that bit stream and locks its clock to that bit stream. In one embodiment, this is being accomplished with a multiplexer chip set and local oscillators, as will be described below. Splitting and combining the signals in a digital state avoids the combining and splitting losses experienced with an analog system. In addition, transporting the digital signals over multimode fiber results in a low cost transport system that is not subject to much degradation.

II. Second Embodiment

A. Remote Antenna Unit

Figures 2, 2A:
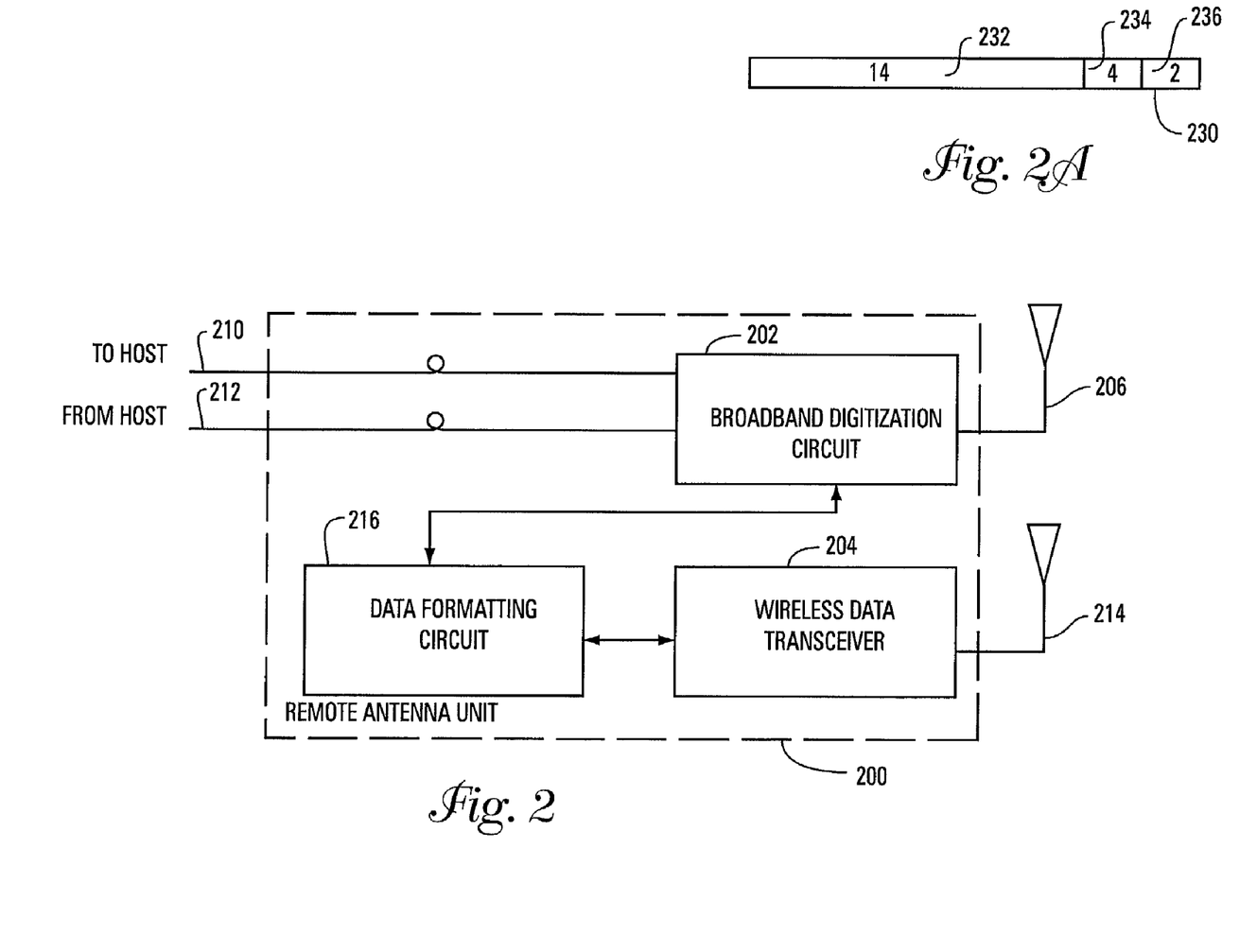
FIG. 2 is a block diagram of one embodiment of a remote antenna unit for a communication system according to the teachings of the present invention.
FIG. 2A is a block diagram of one embodiment of a data format according to the teachings of the present invention.

FIG. 2 is a block diagram of one embodiment of a remote antenna unit, indicated generally at 200, for a communication system according to the teachings of the present invention. Remote antenna unit 200 advantageously combines both wireless telephony and wireless data into a common housing for transport over a common network. Remote antenna unit 200 includes broadband digitization circuit 202 and wireless data transceiver 204.

Remote antenna unit 200 receives and transmits telephony signals using broadband digitization circuit 202 and antenna 206. Broadband digitization circuit 202 is adapted to support cellular communication according to any appropriate standard, e.g., Analog Mobile Phone System (AMPS), Total Access Communication System (TACS), Global System for Mobile Communications (GSM), IS-54, IS-95, IS-136 or other analog or digital cellular communication standard. In other embodiments, broadband digitization circuit 202 supports communications in the Personal Communication Service (PCS) frequency band, e.g., 2 GHz. Broadband digitization circuit 202 that digitizes the RF spectrum and communicates with a host unit or expansion unit over links 210 and 212. In one embodiment, links 210 and 212 comprise fiber optic links. In other embodiment, links 210 and 212 comprise other appropriate communication medium such as coaxial cable, twisted pair, infrared, or other appropriate fiber, wireless or copper-based communication medium for carrying wireless telephony signals and wireless data.

Remote antenna unit 200 further communicates data with wireless data terminals using wireless data transceiver 204 and antenna 214. In one embodiment, antenna 214 and antenna 206 are combined in a common antenna used for both data and telephony. Wireless data transceiver 204 comprises a chip set that uses one or more of a number of standards for wireless local area networks. For example, in one embodiment, wireless data transceiver 204 uses the HIPERLAN standard that is prevalent in Europe. In other embodiments, wireless data transceiver 204 supports one of the 802.11 family of WLAN standards promulgated by the Institute of Electrical and Electronics Engineers (IEEE) to implement its wireless data portion. Further, in other embodiments, wireless data transceiver 204 uses wireless personal area network (PAN) technology from the Bluetooth Special Interest Group or the HomeRF working group.

Wireless data transceiver 204 provides data to data formatting circuit 216. Data formatting circuit 216 formats the wireless LAN data for transport to the host unit along with the telephony signals from broadband digitization circuit 202. In one embodiment, data formatting circuit 216 is implemented in a Xilynx processor that generates Ethernet data from the wireless data transceiver 204.

This Ethernet data is formatted for transmission to the host unit. In one embodiment, the Ethernet data is formatted to be inserted into 20 bit words shown in FIG. 2A. Each word 230 includes 14 bits of telephony data 232. This data is a digitization of the RF spectrum used to carry the wireless telephony data. Further, alarm bits 236 make up another 2 bits of the 20 bit word. The remaining 4 bits, 234, are used to carry the wireless data, e.g., the Ethernet data, to the host unit. Further, in other embodiments, one or more bits in word 230 are used for control of the transmission of the Ethernet data.

In one embodiment, the broadband digitization circuit 202 processes signals at a data rate of approximately 1.2 Gigabits/second. With this rate, the four bits 234 correspond to a data channel with 284 Megabits/second capacity.

In other embodiments, wireless transceiver 202 provides the data to the host unit as analog data. In this case, the data from formatting circuit 216 is provided on an appropriate carrier and added to the analog signal for transmission to the host unit.

In operation, remote antenna unit 200 processes both wireless telephony signals and wireless data within a substantially enclosed structure, e.g., an office building, using a single distribution network and a common housing for both services. In one embodiment, telephony signals are received at antenna 206 and digitized by broadband digitization circuit 202 for transmission to the host unit. When wireless data is received with transceiver 204, it is provided to data formatting circuit 216. The formatted data is provided to broadband digitization circuit 202. Broadband digitization circuit 202 incorporates the wireless data in with the digitized wireless telephony signals for transmission over link 210 to the host unit.

In the upstream direction, broadband digitization circuit 202 receives signals over link 212. These signals include wireless telephony signals and wireless data. The wireless telephony signals are converted to signals for transmission at antenna 206. The wireless data is provided to formatting circuit 216. Formatting circuit 216 formats the data for transmission by wireless data transceiver 204.

B. Expansion Unit

Figure 3:
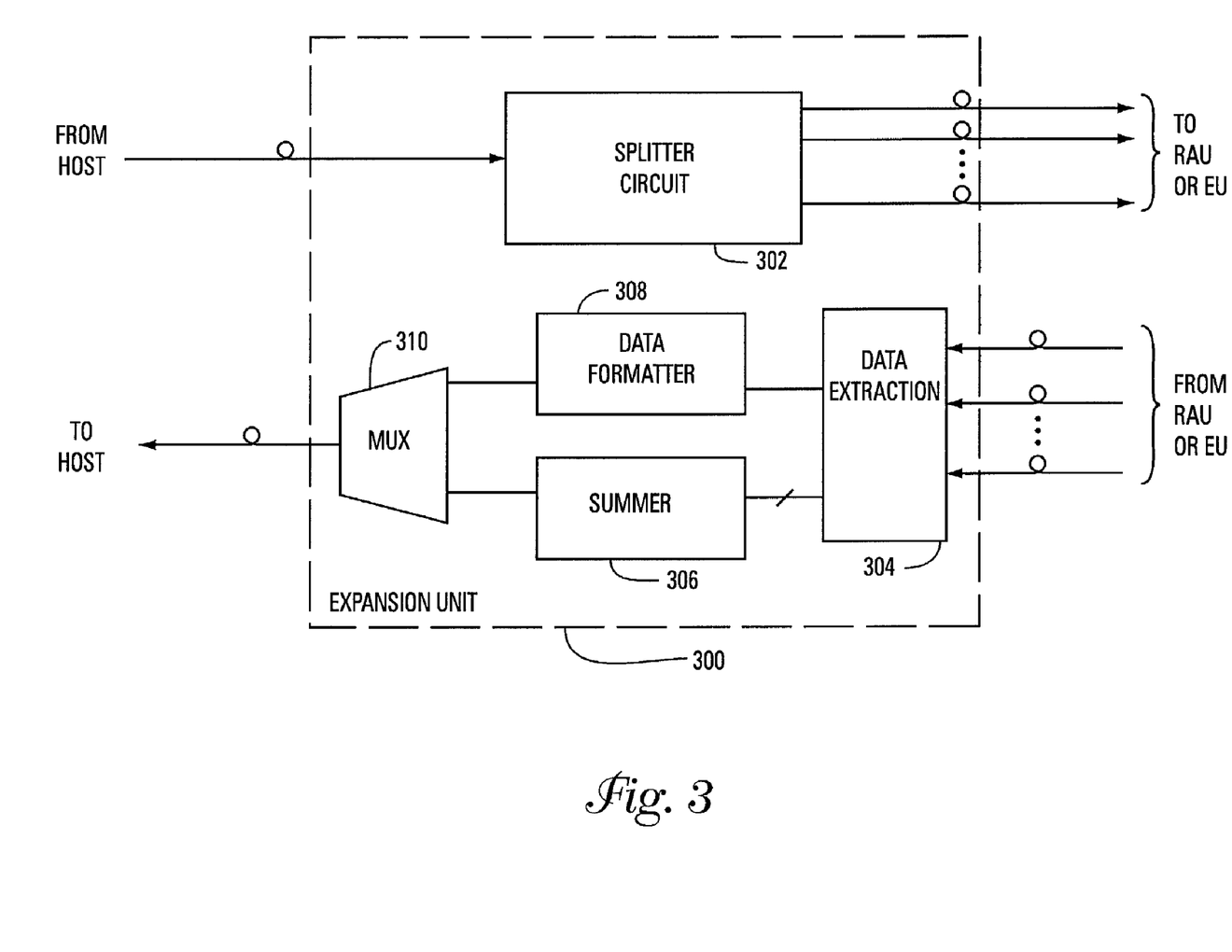
FIG. 3 is a block diagram of one embodiment of an expansion unit for a communication system according to the teachings of the present invention.

FIG. 3 is a block diagram of one embodiment of an expansion unit, indicated generally at 300, for a communication system according to the teachings of the present invention. Expansion unit 300 is used to allow multipoint to point communication. Specifically, expansion unit 300 allows a single connection to the host unit to provide connection to a plurality, e.g., six, twelve or other appropriate number, remote antenna units such as remote antenna units as shown and described with respect to FIG. 2. In the upstream direction from the host unit to the remote antenna units, expansion unit 300 includes splitter circuit 302. Splitter circuit 302 receives signals that include both wireless data and wireless telephony signals from the host unit. Splitter 302 splits these signals and provides the signals to the plurality of remote antenna units.

Expansion unit 300 includes additional circuitry in the reverse direction from the remote antenna units to the host unit. Specifically, in one embodiment, expansion unit 300 includes data extraction circuit 304 that receives data from the remote antenna units. In one embodiment, this data comprises digital data in the format described above with respect to FIG. 2A. Data extraction circuit 304 extracts the wireless data from the four bit positions in each 20-bit word and provides the data to data formatter 308. In one embodiment, data extraction circuit 304 further buffers data depending on, for example, traffic levels. The wireless telephony signals, e.g., 14 of the 20 bits in each word, are provided to summer 306. Summer 306 sums the signals from each of the remote antenna units thus effectively combining the RF signals from these remote antenna units as described in the '431 application.

Data formatter 308 formats the wireless data from the plurality of remote antenna units for insertion into the wireless telephony data output by summer 306.

Expansion unit 300 also includes multiplexer 310. Multiplexer 310 inserts the wireless data from data formatter 308 into the wireless telephony data from summer 306. In one embodiment, multiplexer 310 inserts the telephony data into 14 bits of 20 bit words and inserts the wireless data into 4 bits of the 20 bit words. This combined data is provided to the host unit as, for example, a 1.4 Gbit/s signal. In one embodiment, this insertion is accomplished on a first-in first-out basis for the Ethernet packets received at data formatter 308.

C. Host Unit

Figure 4:
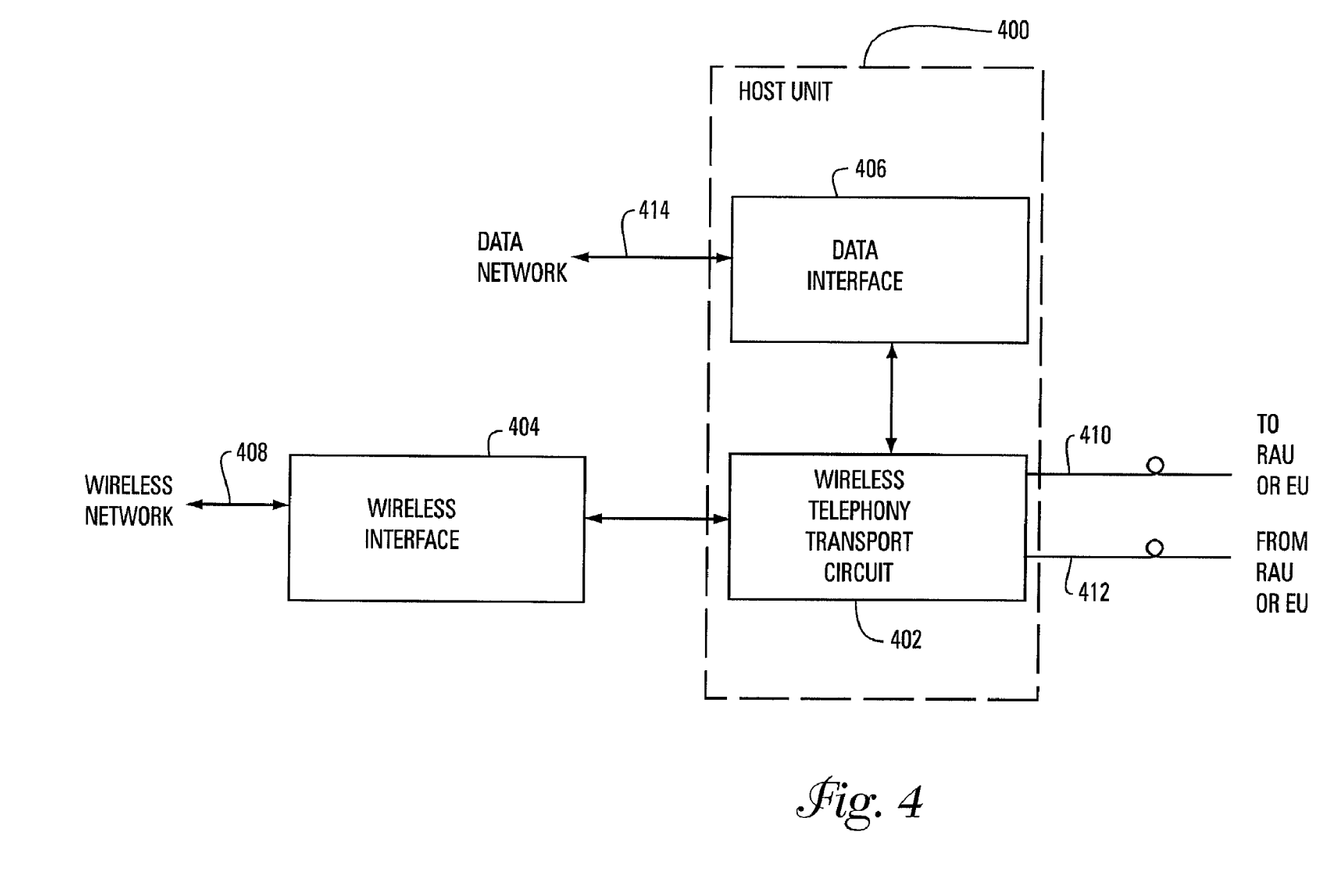
FIG. 4 is a block diagram of one embodiment of a host unit according to the teachings of the present invention.

FIG. 4 is a block diagram of one embodiment of a host unit, indicated generally at 400, according to the teachings of the present invention. Host unit (HU) 400 supports both wireless telephony and wireless data. On the wireless telephony side, host unit 400 is coupled to wireless interface 404. In one embodiment, wireless interface 404 comprises a bi-directional amplifier. In another embodiment, wireless interface 404 comprises a base station that is adapted to support cellular communication according to any appropriate standard, e.g., Analog Mobile Phone System (AMPS), Total Access Communication System (TACS), Global System for Mobile Communications (GSM), IS-54, IS-95, IS-136 or other analog or digital cellular communication standard. In other embodiments, broadband digitization circuit 202 supports communications in the Personal Communication Service (PCS) frequency band, e.g., 2 GHz. Wireless interface 404 provides connection to an external network at 408, e.g., a base station, a mobile switching center, the Public Switched Telephone Network (PSTN) or other appropriate network.

Host unit 400 further includes wireless telephony transport circuit 402. In one embodiment, telephony transport circuit 402 receives RF signals from the wireless interface 404 and digitizes the RF signals and optically transmits the digital RF signals to multiple RAUs via transmission lines 410. Telephony transport circuit 402 also receives digitized RF signals over transmission lines 412 from a plurality of RAUs either directly or indirectly via EUs, reconstructs the corresponding analog RF signals, and applies the analog RF signals to wireless interface 404.

In one embodiment, host unit 400 receives signals directly from a plurality of RAUs. Wireless telephony transport circuit 402 separates telephony signals from the data signals. The telephony signals are digitally summed and then converted to analog signals and transmitted to wireless interface 404. In another embodiment, host unit 400 receives signals from one or more EUs and one or more RAUs directly. Again, the telephony signals are separated from the data signals and the telephony signals are digitally summed and then converted to analog signals and transmitted to wireless interface 404. The signals received via transmission lines 412 may be received directly from a RAU or from an EU. If the signals are from an EU, the EU sums signals from a plurality of RAUs together and then transports the summed signal to the host unit 400 via transmission lines 412 for additional summing and conversion for transport to wireless interface 404.

In one embodiment, transmission lines 410 and 412 comprise multimode fiber pairs. In an alternate embodiment, each fiber pair is replaced by a single fiber, carrying bi-directional optical signals through the use of wavelength division multiplexing (WDM). In an alternate embodiment, transmission lines 410 and 412 comprise single mode fibers, coaxial cable, twisted pair or other alternative wireless, fiber or copper-based communication medium. In one embodiment, host unit 400 provides six connections that are each coupled to one of a remote antenna unit or an expansion unit.

Data interface 406 is coupled to wireless telephony transport circuit 402. Data interface 406 processes the wireless data for host unit 400. Data interface 406 is coupled to a wired local area network (LAN) at 414. In the upstream direction, data interface 406 receives data at 414 from a wired LAN, e.g., from an Ethernet hub. Data interface 406 provides the data to wireless telephony transport circuit. This data is inserted into the wireless telephony data for transport to remote antenna units. For example, in one embodiment, the wireless data is inserted into 4 bit positions in 20 bit words as shown in FIG. 2A. This data is transported over connection 410 to remote antenna units and expansion units.

In the downstream direction, host unit 400 receives signals that include wireless data at wireless telephony transport circuit 402. This wireless data is extracted from the wireless telephony data and provided to data interface 406. Data interface 406 provides this wireless data to the wired LAN or hub.

III. Third Embodiment

A. Remote Antenna Unit

Figure 5:
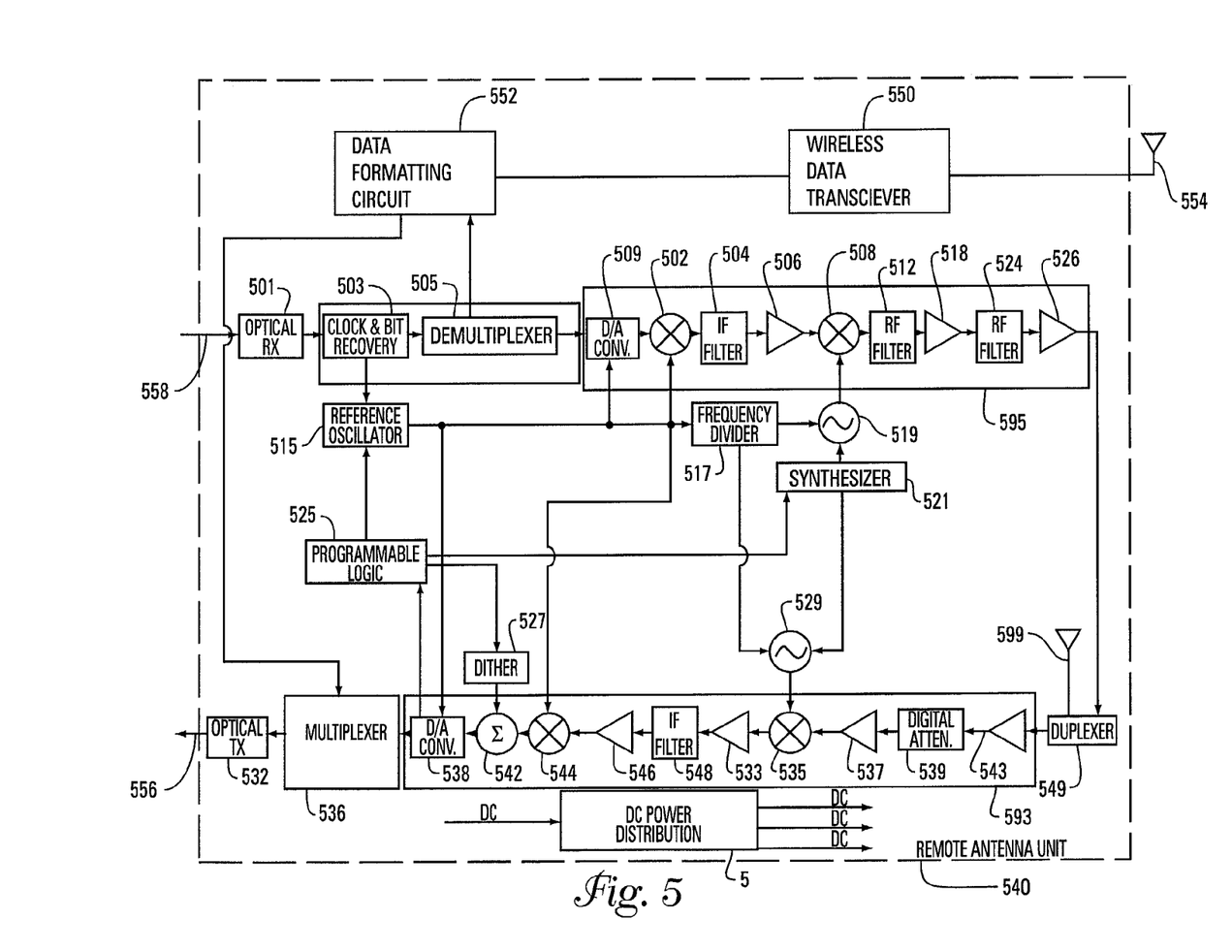
FIG. 5 is a block diagram of another embodiment of a remote antenna unit according to the teachings of the present invention.

FIG. 5 is a block diagram of another embodiment of a remote antenna unit (RAU) 540 constructed according to the teachings of the present invention. RAU 540 includes circuitry for communication of wireless telephony and for communication of other wireless data. The circuitry for each function is described in turn below.

i. Wireless Telephony

A digital optical receiver 501 receives the optical digital data stream transmitted from a HU directly or via a EU. Receiver 501 converts the optical data stream to a corresponding series of electrical pulses. The electrical pulses are applied to clock and bit recovery circuit 503. The series of electrical pulses are then applied to demultiplexer 505. Demultiplexer 505 extracts the digitized telephony traffic and the wireless data from the electrical pulses from clock and bit recovery circuit 503. Demultiplexer 505 also converts the telephony signals from serial to parallel. The output parallel signal is then applied to digital to RF converter 595 for conversion to RF and transmission to duplexer 547. RF converter 595 is connected to antenna 599 through duplexer 547. Accordingly, radio frequency telephony signals originating from a wireless interface device are transmitted from antenna 599.

In one embodiment, digital to RF converter 595 includes a digital-to-analog (D/A) converter 509, which reconstructs the analog RF signal and applies it to IF filter 504 and amplifier 506. The analog signal is mixed with an output signal of reference oscillator 515 by mixer 502. The output of amplifier 506 is mixed with a signal from local oscillator 519 that locks the RF signal with the return digital signal via reference oscillator 515 that is coupled to local oscillator 519. In one embodiment, the reference oscillator 515 is coupled to frequency divider 517 that in turn is coupled to local oscillators 519 and 529. The local oscillators 519 and 529 are also coupled to synthesizer 521 that is coupled to programmable logic device 525.

RF signals received at antenna 599 are passed through duplexer 547 to RF to digital converter 593. The RF signals are converted to digital telephony signals and then applied to multiplexer 536. Multiplexer 536 converts the digital telephony signals from parallel-to-serial and combines the digital telephony signals with wireless data and optically transmits the combined signals via optical transmitter 532 to a EU or HU.

In one embodiment, RF to digital converter 593 includes a first amplifier 543 that receives RF signals from duplexer 547, amplifies the signals and transmits them to digital attenuator 539. In one embodiment, amplifier 543 is a low noise amplifier. Digital attenuator 539 receives the amplified signals and digitally attenuates the signal to control the levels in case of an overload situation. RF to digital converter 593 further includes a second amplifier 537, which receives the attenuated signals, amplifies the signals and applies the amplified signals to mixer 535. Mixer 535 mixes the amplified signals with a signal received from local oscillator 529. The resultant signals are applied to a third amplifier 533 an IF filter 548 and a fourth amplifier 546 in series to down convert to an IF signal. The IF signal is then mixed with a signal from reference oscillator 515 and the mixed signal is summed with a signal from dither circuit 527. The resultant signal is applied to analog-to-digital converter 538 and converted to a digital signal. The output digital signal is then applied to a multiplexer 536. In one embodiment, the multiplexer 536 multiplexes the signal together with a couple of extra bits to do framing and control information. In one embodiment, multiplexer 536, clock and bit recovery circuit and demultiplexer 505 comprise a multiplexer chip set.

Programmable logic circuit 525 programs synthesizer 521 for the reference oscillator and for the up and down conversion of local oscillators 519 and 529. The programmable logic circuit 525 looks for error conditions, for out of lock conditions on the oscillators and reports error modes and looks for overflow condition in the A/D converter 538. If an overflow condition occurs the programmable logic circuit 525 indicates that signals are saturating and adds some extra attenuation at digital attenuator 539 in order to reduce the RF signal levels coming in from RF antenna 599 and protect the system from overload.

In one embodiment, RAU 540 includes an internal direct current power distribution system 5. In one embodiment, the distribution system receives 48 VDC and internally distributes 3 outputs of +3.8V, +5.5V and +8V.

ii. Wireless Data

Remote antenna unit 540 includes wireless data transceiver 550 and antenna 554 for communicating wireless data as part of a wireless local area network. In one embodiment, antenna 554 and antenna 599 are combined in a common antenna used for both data and telephony through a triplexer in place of diplexer 547. Wireless data transceiver 550 comprises a chip set that uses one of a number of standards for wireless local area networks. For example, in one embodiment, wireless data transceiver 550 uses the HIPERLAN standard that is prevalent in Europe. In other embodiments, wireless data transceiver 550 supports one of the 802.11 family of WLAN standards promulgated by the Institute of Electrical and Electronics Engineers (IEEE) to implement its wireless data portion. Further, in other embodiments, wireless data transceiver 550 uses wireless personal area network (PAN) technology from the Bluetooth Special Interest Group or the HomeRF working group.

Wireless data transceiver 550 provides data to data formatting circuit 552. Data formatting circuit 552 formats the wireless LAN data for transport to the host unit along with the telephony signals at multiplexer 536. In one embodiment, data formatting circuit 552 is implemented in a Xilynx processor that generates Ethernet data from the wireless data transceiver 550.

This Ethernet data is formatted for transmission to the host unit. In one embodiment, the Ethernet data is formatted to be inserted into 20 bit words shown in FIG. 2A as described above.

In operation, remote antenna unit 540 processes both wireless telephony and wireless data within a substantially enclosed structure, e.g., an office building, using a single distribution network and a common housing for both services. In one embodiment, telephony signals is received at antenna 599 and RF to digital converter 593 and digitized for transmission to the host unit. When wireless data is received with transceiver 550, the wireless data is provided to data formatting circuit 552. The formatted data is provided to multiplexer 536. Multiplexer 536 incorporates the wireless data in with the wireless telephony signals for transmission over link 556 to the host unit.

In the upstream direction, optical receiver 503 receives signals over link 212. These signals include wireless telephony and wireless data. The wireless telephony signals are converted to signals for transmission at antenna 599 by digital to RF converter 595. The wireless data is provided to formatting circuit 552. Formatting circuit 552 formats the data for transmission by wireless data transceiver 550 and antenna 554.

B. Expansion Unit

Figure 6:
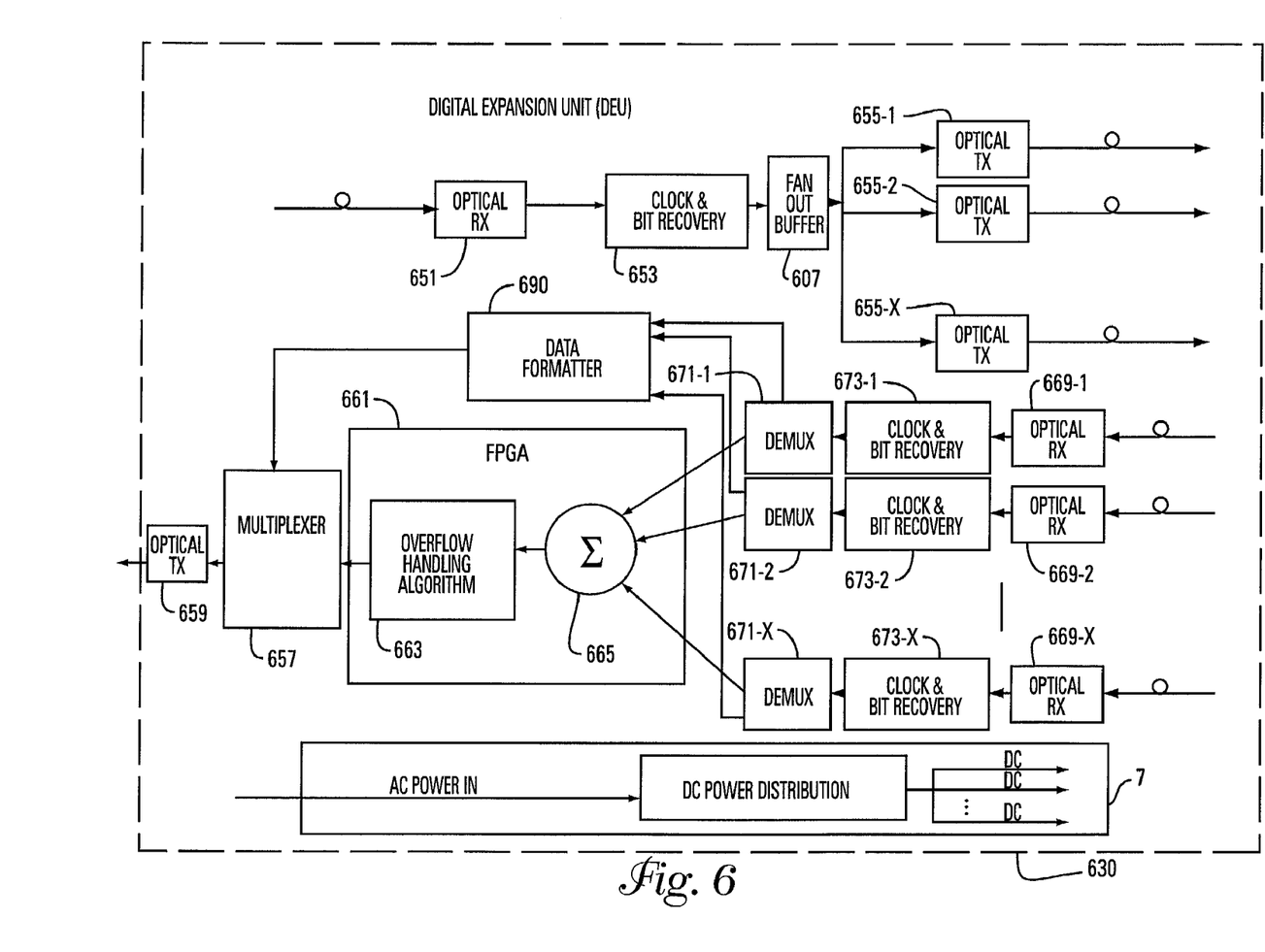
FIG. 6 is a block diagram of another embodiment of an expansion unit according to the teachings of the present invention.

FIG. 6 is a block diagram of one embodiment of a digital expansion unit (EU) 630 constructed according to the teachings of the present invention. EU 630 is designed to receive optical signals and transmit optical signals. The optical signals include both wireless telephony and wireless data that are carried over the same transport medium.

In the upstream direction (to the remote antenna units), an optical receiver 651 receives digital signals that include both digitized RF signals and wireless data. These digital signals are transmitted to clock and bit recovery circuit 653 that performs clock and bit recovery to lock the local clock and clean up the signal. The signals are then split into X digital signals by 1 to X fan out buffer 607. The signals are then transmitted via optical transmitters 655-1 to 655-X to X receiving units such as EUs or RAUs. The X receiving units may be any combination of EUs or RAUs. In one embodiment, X is equal to six.

EU 630 also includes optical receivers 669-1 to 669-X, which receive digital signals directly from RAUs or indirectly via EUs. These digital signals include digitized RF signals for wireless telephony and wireless data. In operation the signals are received, applied to clock and bit recovery circuits 673-1 to 673-X respectively to lock the local clock and clean up the signals and then applied to demultiplexers 671-1 to 671-X. Demultiplexers 671-1 to 671-X each extract the digitized wireless telephony traffic and apply the samples to field programmable gate array 661. The wireless telephony signals are summed together digitally and transmitted to multiplexer 657.

Demultiplexers 671-1 to 671-X extract the wireless data and provide the wireless data to data formatter 690. Demultiplexers 671-1 to 671-X further buffer data as necessary due to, for example traffic levels. Data formatter 690 formats the data for transmission to the host unit. In one embodiment, data formatter 690 processes the data in a first-in first-out based on the order of data received from demultiplexers 671-1 to 671-X.

Multiplexer 657 is coupled to FPGA 661 and data formatter 690. Multiplexer 657 multiplexes the wireless data signals with the wireless data signal. Further, framing and control information is also added. In addition, the multiplexer 657 converts the signals parallel to serial. The signals are then applied to optical transmitter 659 for further transmission. In one embodiment, the signals are directly transmitted to a HU or indirectly via one or more additional EUs.

In one embodiment, the FPGA 661 includes summer 665, which mathematically sums together the wireless telephony signals received from demultiplexers 671-1 to 671-X. In another embodiment, FPGA 661 includes an overflow algorithm circuit 663 coupled to the output of summer 665. The algorithm circuit 663 allows the summed digital RF signals to saturate and keep the summed signal within a defined number of bits. In one embodiment, the algorithm circuit includes a limiter. In one embodiment, the RF signals are 14-bit signals and when summed and limited by summer 665 and overflow algorithm 663 result in a 14-bit output signal.

In one embodiment, EU 630 includes an alternating current to digital current power distribution circuit 7 that provides direct current power to each of the RAUs coupled to EU 630.

In an alternate embodiment, the digital host unit (HU) and wireless interface device (WID) are located some distance from the building being served. The HU in the building is replaced by a EU, and the link between that EU and the remotely located HU is via single mode fiber.

In another alternate embodiment, the wireless interface device (WID) is a software defined base station, and the interface between the HU and WID takes place digitally, eliminating the need for the RF to digital conversion circuitry in the HU.

C. Host Unit

Figure 7:
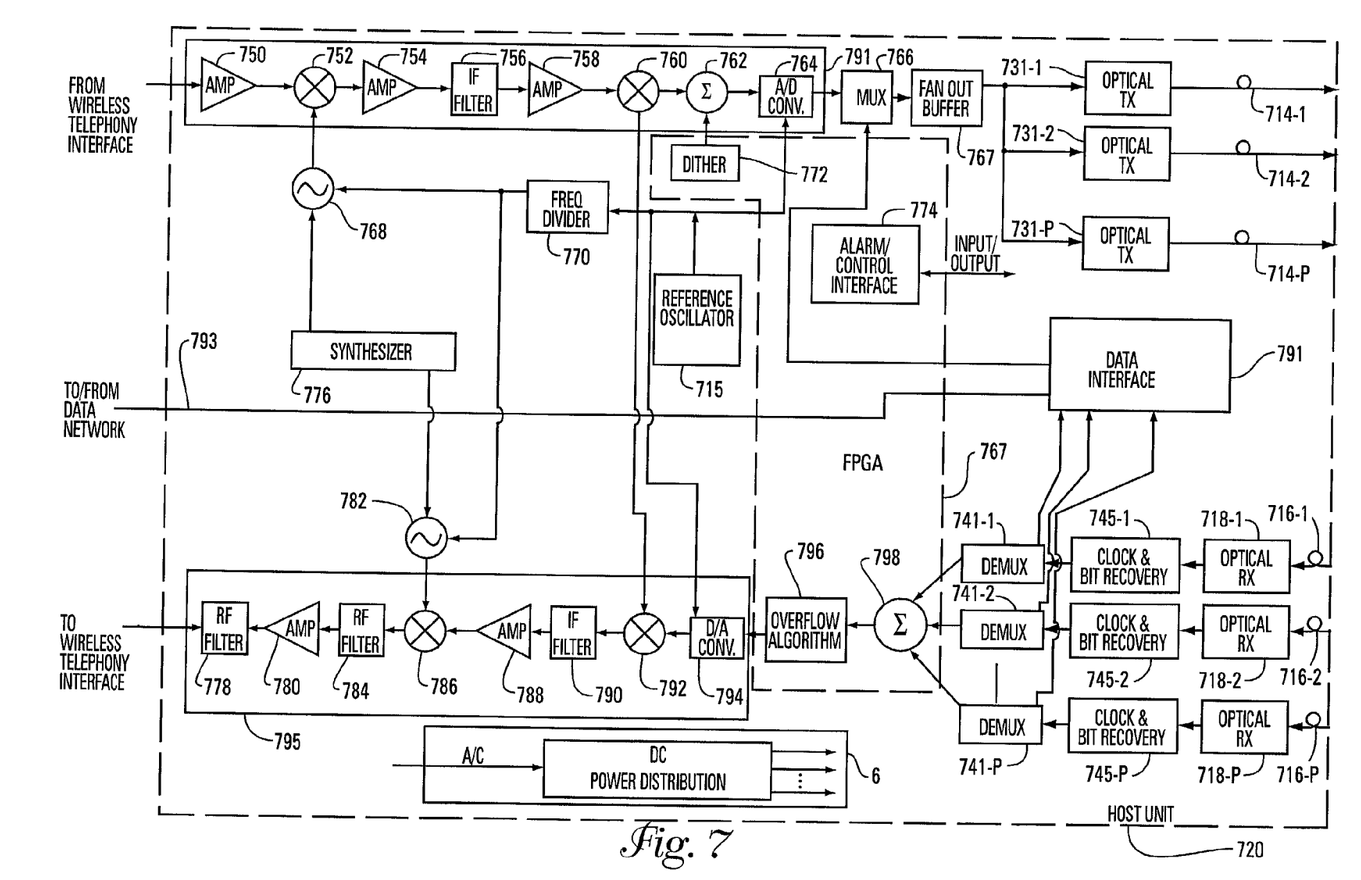
FIG. 7 is a block diagram of another embodiment of a host unit according to the teachings of the present invention.

FIG. 7 is a block diagram of another embodiment of a host unit (HU), indicated generally at 720, that supports the distribution of wireless telephony and wireless data over the same infrastructure according to the teachings of the present invention. HU 720 includes an RF to digital converter 791 receiving the wireless telephony signals from a wireless interface device such as a base station, BDA or the like. RF to digital converter 791 provides a digitized traffic stream that is transmitted to multiplexer 766. Multiplexer 766 converts the parallel output of the A/D converter into a framed serial bit stream.

Advantageously, multiplexer 766 is also coupled to data interface 791. Data interface 766 processes the wireless data for host unit 720. Data interface 766 is coupled to a wired local area network (LAN) at 793. In the upstream direction, data interface 766 receives data at 793 from a wired LAN, e.g., from an Ethernet hub. Data interface 766 provides the data to multiplexer 764 for combination with the wireless telephony signals to be transported to a remote antenna unit.

At the output of the multiplexer 766 is a 1 to P fan out buffer 707, which splits the digital signal P ways. There are P optical transmitters 731-1 to 731-P one feeding each of the P optical transmission lines 714-1 to 714-P. The digitized signals are applied to fibers 714-1 to 714-P for transmission to corresponding RAUs either directly or via EUs. In one embodiment, P is equal to 6.

In one embodiment, HU 720 includes an amplifier 750 that receives the combined RF signal from a wireless interface device such as a base station or BDA. The combined RF signal is amplified and then mixed by mixer 752 with a signal received from local oscillator 768. Local oscillator 768 is coupled to reference oscillator 715. In one embodiment the local oscillator is coupled to a frequency divider circuit 770, which is in turn coupled to reference oscillator 715. The local oscillator is locked to the reference oscillator 715 as a master clock so that the down conversion of the RF signals is the same as the up conversion. The result is end to end, from HU to RAU, or HU to one or more EUs to RAU, no frequency shift in the signals received and transmitted. The local oscillator 763 is also coupled to a synthesizer circuit 776.

The output signal of mixer 752 is provided to amplifier 754 amplified and then filtered via intermediate frequency (IF) filter 756. The resultant signal is the combined RF signal converted down to an IF signal. The IF signal is mixed with another signal originating from the reference oscillator 715 via mixer 760. The output of mixer 760 is summed together at 762 with a signal produced by field programmable gate array (FPGA) 767. The output is then converted from an analog signal to a digital signal via analog/digital (A/D) converter 764 once converted the digital RF signal is applied to multiplexer 766. In one embodiment, the A/D converter 764 is a 14-bit converter handling a 14-bit signal. In other embodiments, the A/D converter 764 may be of any size to accommodate an appropriate signal. In one embodiment, the input signal from FPGA 767 is a dither signal from dither circuit 762 that adds limited out of band noise to improve the dynamic range of the RF signal.

In one embodiment, HU 720 includes an alternating current to digital current power distribution circuit 6 that provides direct current power to each of the RAUs coupled to HU 720.

HU 720 further includes a plurality of digital optical receivers 718-1 to 718-P in the reverse path. Receivers 718-1 to 718-P each output an electronic digital signal, which is applied to clock and bit recovery circuits 745-1 to 745-P, respectively, for clock and bit recovery of the electronic signals. The signals are then applied to demultiplexers 741-1 to 741-P, respectively. Demultiplexers 741-1 to 741-P extract the digitized signals generated at the RAUs, as will be explained in detail below. Demultiplexers 741-1 to 741-P further extract wireless data and alarm (monitoring) and control information framed with the wireless telephony signals. The wireless data extracted by demultiplexers 741-1 to 741-P is applied to data interface 791. Data interface 791 provides this wireless data to the wired LAN or hub at 793.

The wireless telephony signals output at each demultiplexer 741-1 to 741-P are then applied to FPGA 767 where the signals are summed together and then applied to digital to RF converter 795. Converter 795 operates on the sum of the digitized signals extracted by demultiplexers 741-1 to 741-P, reconstructing baseband replicas of the RF signals (wireless telephony) received at all the digital remote units. The baseband replicas are then up-converted to their original radio frequency by mixing with a local oscillator 782 and filtering to remove image frequencies. Local oscillator 782 is coupled to synthesizer 776 and reference oscillator as discussed with respect to local oscillator 768 above.

In one embodiment, digital to RF converter 795 includes digital to analog (D/A) converter 784 coupled to an output of FPGA 767 the digitized RF signals are converted to analog RF signals and then mixed with a signal from reference oscillator 715 by mixer 792. The signal is then filtered by IF filter 790 and amplified by amplifier 788. The resultant signal is then mixed with a signal from local oscillator 782 and then applied to RF filter 784, amplifier 780 and RF filter 778 for transmission by a wireless interface device such as a BDA or base station.

In one embodiment, FPGA 767 includes an alarm/control circuit 774, which extracts overhead bits from RAUs to monitor error and alarm information. In one embodiment, the FPGA 767 includes a summer 798, which mathematically sums together the wireless telephony signals received from fibers 716-1 to 716-P. In another embodiment FPGA includes an overflow algorithm circuit 796 coupled to the output of summer 798. The algorithm circuit 796 allows the summed digital RF signals to saturate and keep the summed signal within a defined number of bits. In one embodiment, the algorithm circuit includes a limiter. In one embodiment, the RF signals are 14-bit signals and when summed and limited by summer 798 and overflow algorithm 796 result in a 14-bit output signal.

For example, in one embodiment each of the digital RF signals received from fibers 716-1 to 716-P, where P is equal to 6, comprise 14 bit inputs. All of those 6 different 14 bit inputs then go into summer 798. In order to allow for overflow, at least 17 bits of resolution is needed in the summer 798 to handle a worst-case scenario when all 6 of the 14 bit inputs are at full scale at the same time. In this embodiment, a 17-bit wide summer 798 is employed to handle that dynamic range. Coming out of summer 798 is needed a 14-bit signal going in the reverse path. In one embodiment, an algorithm circuit 796 for managing the overflow is implemented. In one embodiment, the summer and 798 and overflow algorithm 796 are included in FPGA 767. In one embodiment, overflow algorithm 796 acts like a limiter and allows the sum to saturate and keeps the summed signal within 14 bits. In an alternate embodiment, overflow algorithm circuit 796 controls the gain and scales the signal dynamically to handle overflow conditions.

Although specific embodiments have been illustrated and described herein, it will be appreciated by those of ordinary skill in the art that any arrangement which is calculated to achieve the same purpose may be substituted for the specific embodiments shown. For example, a remote antenna unit is not limited to the receipt and summing and splitting and transmitting of digitized radio frequency signals. In other embodiments, the host unit is capable of receiving and summing analog radio frequency signals in addition to or instead of digitized radio frequency signals. As well, the host unit is capable of splitting and transmitting analog radio frequency signals in addition to or instead of digitized radio frequency signals. Further, it is understood that a single wireless terminal may function as both a wireless data terminal and a wireless telephony terminal by communicating both wireless telephony signals and wireless data. Thus, the data and telephony portions of the remote antenna units may both communicate with the same wireless terminals. This application is intended to cover any adaptations or variations of the present invention. Therefore, it is intended that this invention be limited only by the claims and the equivalents thereof.

What is claimed is:

1. A communication system, comprising:
   a host unit that is adapted to communicate wireless telephony signals with a telephony network and adapted to communicate wireless data with at least one data network;
   a communication link that carries both the wireless telephony signals and the wireless data; and
   at least one remote antenna unit, communicatively coupled to the host unit over the communication link, wherein the remote antenna unit includes:
   a broadband digitization circuit, that is adapted to communicate wireless telephony signals with wireless terminals,
   a wireless data transceiver that is adapted to communicate wireless data with wireless terminals, and
   a data formatting circuit coupled between the wireless data transceiver and the broadband digitization circuit that formats the wireless data for transmission to the host unit and to the wireless terminals.

2. The system of claim 1, wherein the broadband digitization circuit supports wireless telephony communication according to at least one of Analog Mobile Phone System (AMPS), Total Access Communication System (TACS), Global System for Mobile Communications (GSM), IS-54, IS-95, IS-136 and Personal Communication Service (PCS) standards and services.

3. The system of claim 1, wherein the wireless data transceiver supports at least one of the HIPERLAN standard, one of the 802.11 family of wireless local area network standards promulgated by the Institute of Electrical and Electronics Engineers (IEEE), and wireless personal area network (PAN) technology from the Bluetooth Special Interest Group and the HomeRF working group.

4. The system of claim 1, wherein the broadband digitization circuit includes an RF to digital converter that digitizes the RF spectrum used for the wireless telephony signals.

5. The system of claim 4, wherein the broadband digitization circuit includes a multiplexer that inserts wireless data into data words with the digitized RF spectrum.

6. The system of claim 5, wherein the data words include 14 bit locations for the wireless telephony signals and 4 bit locations for the wireless data.

7. A remote antenna unit for communicating with wireless data terminals and wireless telephones, the unit comprising:
   a broadband digitization circuit, that is adapted to communicate with the wireless telephones;
   wherein the broadband digitization circuit includes a port that is configured to communicate with a host unit over a communication link used for both wireless data and wireless telephony signals;
   a wireless data transceiver that is adapted to communicate with the wireless data terminals; and
   a data formatting circuit coupled between the wireless data transceiver and the broadband digitization circuit that formats the wireless data for transmission to the wireless data terminals and for transmission to a host unit over the communication link with the wireless telephony signals.

8. The remote antenna unit of claim 7, wherein the broadband digitization circuit supports wireless telephony communication according to at least one of Analog Mobile Phone System (AMPS), Total Access Communication System (TACS), Global System for Mobile Communications (GSM), IS-54, IS-95, IS-136 and Personal Communication Service (PCS) standards and services.

9. The remote antenna unit of claim 7, wherein the wireless data transceiver supports at least one of the HIPERLAN standard, one of the 802.11 family of wireless local area network standards promulgated by the Institute of Electrical and Electronics Engineers (IEEE), and wireless personal area network (PAN) technology from the Bluetooth Special Interest Group and the HomeRF working group.

10. The remote antenna unit of claim 7, wherein the broadband digitization circuit includes an RF to digital converter that digitizes the RF spectrum used for the wireless telephony signals.

11. The remote antenna unit of claim 10, wherein the broadband digitization circuit includes a multiplexer that inserts wireless data into data words with the digitized RF spectrum.

12. The remote antenna unit of claim 11, wherein the data words include 14 bit locations for the digitized wireless telephony signals and 4 bit locations for the wireless data.

13. A method for transporting wireless telephony signals and wireless data in a substantially closed environment, the method comprising:
receiving wireless telephony signals and wireless data at a common location;
formatting the wireless data for transmission;
inserting the formatted wireless data into the wireless telephony signals;
transmitting the wireless data and the wireless telephony signals over a common communication link to a host unit;
providing the wireless telephony signals to a telephony network; and
providing the wireless data to a data network.

14. The method of claim 13, wherein receiving wireless telephony signals and wireless data comprises receiving wireless telephony signals and wireless data at a common antenna.

15. The method of claim 13, and further including digitizing the RF spectrum carrying the wireless telephony signals prior to inserting the formatted wireless data.

16. The method of claim 13, wherein inserting the wireless data into the wireless telephony signals comprises forming N-bit words with X bits for the wireless telephony signals and up to N–X bits for the wireless data.

17. The method of claim 13, wherein transmitting comprises transmitting over a fiber optic communication medium.

18. The method of claim 13, wherein transmitting comprises transmitting over a copper-based communication medium.

19. A communication system, comprising:
a host unit that is adapted to communicate wireless telephony signals with a telephony network and adapted to communicate wireless data with at least one data network;
a communication link that carries both the wireless telephony signals and the wireless data;
at least one remote antenna unit, communicatively coupled to the host unit over the communication link, wherein the remote antenna unit communicates the wireless telephony signals and the wireless data with wireless terminals;
wherein the at least one remote antenna unit includes an RF to digital converter that digitizes the RF spectrum used for the wireless telephony signals;
wherein the at least one remote antenna unit further communicates the digitized RF spectrum used for the wireless telephony signals and wireless data signals with the host unit over the communication link, and
wherein the at least one remote antenna unit includes a multiplexer that inserts wireless data into data words with the digitized RF spectrum.

20. The system of claim 19, wherein the at least one remote antenna unit supports wireless telephony communication according to at least one of Analog Mobile Phone System (AMPS), Total Access Communication System (TACS), Global System for Mobile Communications (GSM), IS-54, IS-95, IS-136 and Personal Communication Service (PCS) standards and services.

21. The system of claim 19, wherein the at least one remote antenna unit supports at least one of the HIPERLAN standard, one of the 802.11 family of wireless local area network standards promulgated by the Institute of Electrical and Electronics Engineers (IEEE), and wireless personal area network (PAN) technology from the Bluetooth Special Interest Group and the HomeRF working group.

22. The system of claim 19, wherein the data words include 14 bit locations for the wireless telephony signals and 4 bit locations for the wireless data.

23. A transport system for transporting signals for first and second wireless networks, the transport system comprising:
a first interface that is adapted to communicate signals with wireless terminals from the first and second wireless networks, wherein the first interface further combines signals from the first and second wireless networks into selected bit locations of shared data words;
a second interface that is adapted to communicate signals with the first and second wireless networks; and
a communication medium, coupled between the first and second interfaces, the communication medium adapted to transport the data words for the first and second wireless networks between the first and second interfaces.

24. The transport system of claim 23, wherein the first interface includes a broadband digitization circuit that digitizes a frequency spectrum for transmission over the communication medium.

25. The transport system of claim 23, wherein the first interface is adapted to communicate signals with a wireless data network and a wireless telephony network.

26. The transport system of claim 23, wherein the communication medium comprises at least one of fiber optic cable, coaxial cable, twisted pair, infrared, microwave, wireless, and copper-based communication medium.

27. The transport system of claim 23, wherein the first interface comprises:
circuitry that supports wireless telephony communication according to at least one of Analog Mobile Phone System (AMPS), Total Access Communication System (TACS), Global System for Mobile Communications (GSM), IS-54, IS-95, IS-136 and Personal Communication Service (PCS) standards and services; and
circuitry that supports at least one of the HIPERLAN standard, one of the 802.11 family of wireless local area network standards promulgated by the Institute of Electrical and Electronics Engineers (IEEE), and wireless personal area network (PAN) technology from the Bluetooth Special Interest Group and the HomeRF working group.

28. A system for transporting wireless telephony signals for a first wireless network and wireless data for a second wireless network, the system comprising:
   a host unit that is adapted to communicate wireless telephony signals with a telephony network and adapted to communicate wireless data with at least one data network;
   a communication link that transports both the wireless telephony signals and the wireless data in common N-bit words with X bits for wireless telephony signals and up to N–X bits for wireless data; and
   at least one remote antenna unit, communicatively coupled to the host unit over the communication link, wherein the remote antenna unit includes:
   a broadband digitization circuit, that is adapted to communicate wireless telephony signals with wireless terminals using a first wireless air interface,
   a wireless data transceiver that is adapted to communicate wireless data with other wireless terminals using a second wireless air interface, a data formatting circuit coupled to the wireless data transceiver that formats the wireless data for transmission onto the host unit and to the wireless terminals;
   a multiplexer, coupled between the data formatting circuit and the broadband digitization circuit, that inserts the formatted wireless data into the common N-bit words for transport to the host unit; and
   a demultiplexer, coupled between the data formatting circuit and the broadband digitization circuit, that removes the wireless data from common N-bit words for transmission by the wireless data transceiver.

29. A remote antenna unit for a system for transporting wireless telephony signals from a first wireless network and wireless data for a second wireless network, the remote antenna unit comprising:
   a broadband digitization circuit, that is adapted to communicate wireless telephony signals with wireless terminals using a first wireless air interface,
   a wireless data transceiver that is adapted to communicate wireless data with other wireless terminals using a second wireless air interface, a data formatting circuit coupled to the wireless data transceiver that formats the wireless data for transmission to a host unit and to the wireless terminals;
   a multiplexer, coupled between the data formatting circuit and the broadband digitization circuit, that inserts the formatted wireless data into the common N-bit words for transport to the host unit; and
   a demultiplexer, coupled between the data formatting circuit and the broadband digitization circuit, that removes the wireless data from common N-bit words for transmission by the wireless data transceiver.

30. A system for transporting wireless telephony signals and wireless data in a substantially closed environment, the system comprising:
   means for receiving wireless telephony signals over a first wireless air interface;
   means for receiving wireless data over a second wireless air interface at a common location with the means for receiving the wireless telephony signals;
   means, coupled to the means for receiving wireless data, for formatting the wireless data for transport;
   means, coupled to the means for formatting, for inserting the formatted wireless data into the wireless telephony signals;
   means, coupled to the means for inserting, for transporting the wireless data and the wireless telephony signals over a common communication link to a host unit;
   means, coupled to the means for transporting, for providing the wireless telephony signals to a telephony network; and
   means, coupled to the means for transporting, for providing the wireless data to a data network.

31. A method for transporting wireless telephony signals and wireless data in a substantially closed environment, the method comprising:
   receiving wireless telephony signals over a first air interface;
   receiving wireless data over a second, different air interface at a common location;
   formatting the wireless data for transport;
   inserting the formatted wireless data into N-bit words used for transporting the wireless telephony signals;
   transporting the N-bit words over a communication link to a host unit;
   providing the wireless telephony signals to a telephony network; and
   providing the wireless data to a data network.

32. A system for transporting wireless signals for a first wireless network and wireless signals for a second wireless network, the system comprising:
   a host unit that is adapted to communicate wireless signals with a first network and adapted to communicate wireless signals with a second network;
   a communication link that transports both the wireless signals for the first wireless network and the wireless signals for the second wireless network in common N-bit words with X bits for the wireless signals for the first wireless network and up to N–X bits for wireless signals for the second wireless network; and
   at least one remote antenna unit, communicatively coupled to the host unit over the communication link, wherein the remote antenna unit includes:
   a broadband digitization circuit, that is adapted to communicate wireless signals with wireless terminals using a first wireless air interface,
   a wireless transceiver that is adapted to communicate wireless signals with other wireless terminals using a second wireless air interface, a data formatting circuit coupled to the wireless transceiver that formats the wireless signals for transmission to the host unit and to the other wireless terminals;
   a multiplexer, coupled between the data formatting circuit and the broadband digitization circuit that inserts the formatted wireless signals into the common N-bit words for transport to the host unit; and
   a demultiplexer, coupled between the data formatting circuit and the broadband digitization circuit, that removes the wireless signals from common N-bit words for transmission by the wireless transceiver.

* * * * *